United States Patent [19]

Burdea

[11] Patent Number: 5,004,391
[45] Date of Patent: Apr. 2, 1991

[54] PORTABLE DEXTROUS FORCE FEEDBACK MASTER FOR ROBOT TELEMANIPULATION

[75] Inventor: Grigore C. Burdea, New York, N.Y.

[73] Assignee: Rutgers University, New Brunswick, N.J.

[21] Appl. No.: 396,476

[22] Filed: Aug. 21, 1989

[51] Int. Cl.$^5$ .............................................. B25J 3/00
[52] U.S. Cl. ....................................... 414/6; 294/88; 336/136
[58] Field of Search ................. 414/4, 5, 6, 7; 294/88; 901/9, 34; 336/136

[56] References Cited

U.S. PATENT DOCUMENTS

| | | |
|---|---|---|
| 3,171,549 | 3/1965 | Orloff . |
| 3,414,137 | 12/1968 | Fortin ..................................... 414/7 |
| 3,449,008 | 6/1969 | Colechia . |
| 3,618,786 | 11/1971 | Fick . |
| 3,637,092 | 1/1972 | George et al. . |
| 3,771,037 | 11/1973 | Balley, Jr. . |
| 3,995,831 | 12/1976 | Spanski . |
| 4,302,138 | 11/1981 | Zarudiansky ........................... 414/5 |
| 4,575,297 | 3/1986 | Richter ................................. 414/7 X |
| 4,604,016 | 8/1986 | Joyce . |
| 4,623,840 | 11/1986 | Fujimura et al. ............... 336/136 X |
| 4,795,296 | 1/1989 | Jau . |

Primary Examiner—David A. Bucci
Assistant Examiner—Donald W. Underwood
Attorney, Agent, or Firm—Mathews, Woodbridge & Collins

[57] ABSTRACT

An electronic position sensor and a pneumatic microactuator form a portable robot master that may be operated by the fingers of a user's hand in the same, natural manner that the user would normally grasp an object to be finger manipulated. The master requires only two contact points to secure its ends to the user's fingers and to be manipulated by the user. The master includes a compact, hand-held unit that fits within the space defined by the user's palm and fingers, and functions as a position controller for a robot having a dextrous hand. The position sensor includes a linear variable differential transformer having an output signal that is proportional to the distance between the user's fingers, i.e. the two contact points, that are used to manipulate the master. A force feedback system, including the pneumatic micro-actuator, senses forces exerted by end effectors on the robot hand and causes a corresponding force to be exerted by the user.

20 Claims, 3 Drawing Sheets

PORTABLE DEXTROUS FORCE FEEDBACK MASTER FOR ROBOT TELEMANIPULATION

BACKGROUND OF THE INVENTION

1. Field of the Invention

The present invention relates to the field of robotics and, more particularly, to a hand-held, compact device to be used as a portable dextrous master in a telemanipulation robotic system.

2. Description of the Prior Art

Present telemanipulation techniques include the use of mechanical masters, open-loop servomasters, and to a lesser extent, closed-loop servomasters Direct mechanical telemanipulation is often the simplest method, but cannot be used in applications where the slave is not in the immediate vicinity of the master. Closed-loop telemanipulation eliminates the proximity requirement but may necessitate the need to have two nearly identical devices to act as master and slave. This duplication of resources is often prohibitive in terms of cost and payload weight Efforts have been made to eliminate the duplicate master by replacing it with force feedback joy sticks, sensorized spheres, pistol grips and the like. Although such devices have served the purpose, they have not proved entirely satisfactory under all conditions of service because these devices are less "natural" to use by an operator since direct similitude does not exist between human hand and robot finger motions. Examples of manual controllers using levers, grippers, handles and like devices, with many having force feedback, may be found in the following U.S. Pat. Nos.: 4,795,296; 3,995,831; 4,604,016; 3,618,786; 3,637,092; and 3,771,037.

Those concerned with the development of telemanipulation devices have recognized the disadvantages of such prior art controllers and the need for a dextrous master controller that uses an operator's hand to replace the classical manipulator arm, the conventional keypad contact, the joy stick or handle, or other similar structure. Use of the human hand is a natural form of control and is applicable for use with both non-dextrous and dextrous slave devices. Further, because the human hand is used as master, duplication of most hardware is not required; and weight, inertia and friction can be reduced. Under most conditions, significant improvements in the time necessary to complete a task can be realized when using the human hand as the master. For example, it has been estimated that an improvement on the order of ten can be expected on the time efficiency when a dextrous master is used in place of a conventional keypad control.

While open-loop dextrous masters create more natural control environments, they lack the ability to bring force feedback to the operator's hand, which in turn limits the utility of the slave device. On the other hand, a dextrous master with force feedback, using much of the human hand as master in a closed-loop teleoperation environment, will allow the efficient execution of complex tasks such as assembly and repair involving the telemanipulation of small, intricately shaped parts. Examples of robotic masters with force feedback and wherein much of the human hand is used as the master may be found in the following U.S. Pat. Nos.: 3,449,008; 3,171,549; and 4,302,139.

Again, these examples demonstrate various prior art attempts at obtaining a controller that would be more "natural" to the operator. Although there has been a long recognized need for a "natural" dextrous master that more closely simulates the motions of the fingers of a dextrous slave, no practical system for doing so has yet been devised. Ideally, such a system should have the capability of being held in a natural position in the operator's hand; would be operated by the operator performing a natural movement; would be relatively light weight; would include a force feedback mechanism that affects the operator's hand in a manner that corresponds directly to the forces generated at the slave; would be compact, portable and simple in construction; and would be dependable in operation. The present invention fulfills this need.

SUMMARY OF THE INVENTION

The general purpose of this invention is to provide a closed-loop dextrous master which embraces all of the advantages of similarly employed masters and possess none of the aforedescribed disadvantages. To attain this, the present invention contemplates a unique arrangement of a position feed forward mechanism and a force feedback system that creates a "natural" controlled environment. More specifically, the system includes a unique combination of an electronic position sensor and a pneumatic micro-actuator to form a portable unit that may be operated by the fingers of a user's hand in the same, natural manner that the user would normally grasp an object to be finger manipulated. The master includes a compact, hand-held unit that fits within the space defined by the user's palm and fingers, and functions as a position controller for a robot having either a conventional gripper or a dextrous hand. A force feedback system, including the pneumatic micro-actuator, senses forces exerted by the robot gripper or fingers and creates a corresponding force in the user's fingers having a corresponding magnitude and location. The master requires only two contact points to secure its ends to the user's fingers and to be manipulated by the user.

It is, therefore, an object of the present invention to provide a portable dextrous master for a telemanipulation robotic system wherein the user performs a natural hand movement that closely simulates the finger movements of a dextrous slave.

Another object is to provide a force feedback mechanism which detects a force in the slave mechanism and responds by generating the corresponding resistance in the master that creates in the user's hand a force similar to the force generated in the slave.

Other objects and many of the attendant advantages of the invention will be readily appreciated as the same becomes better understood by reference to the following detailed description when considered in connection with the accompanying drawings in which like reference numerals designate like parts throughout the figures thereof.

DETAILED DESCRIPTION OF THE PREFERRED EMBODIMENT

Figure 1:
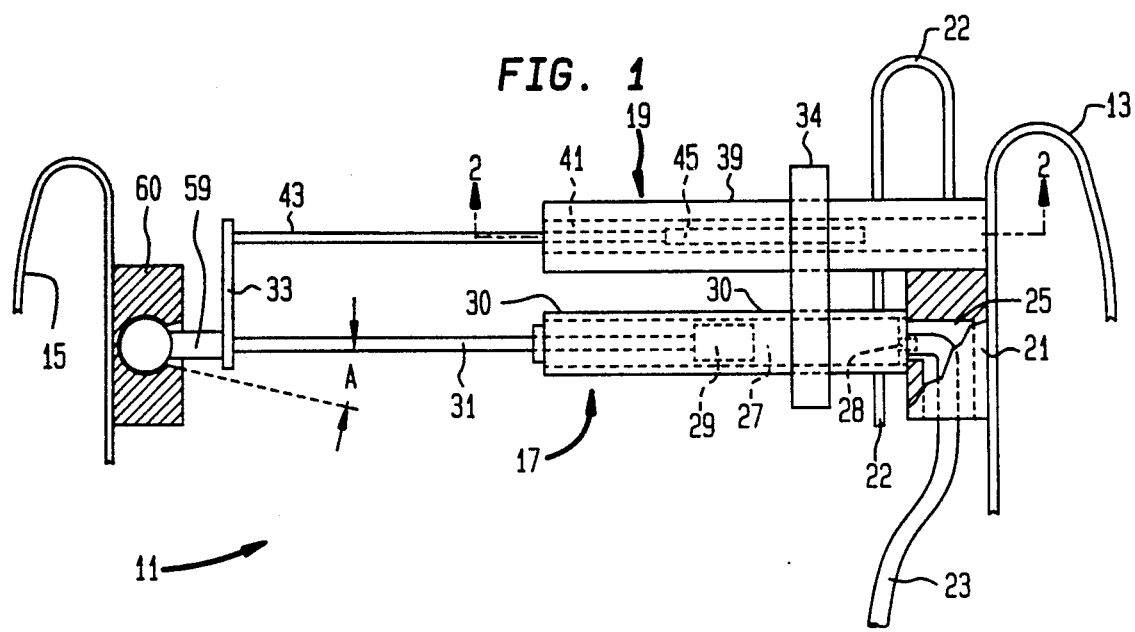
FIG. 1 is an elevation, partly in section, of the preferred embodiment of the master of the present invention.

Referring now to the drawings, there is shown in FIG. 1 a portable dextrous master 11 having a thumb support 13, a finger support 15, a micro-pneumatic piston 17 and a linear variable differential transformer (LVDT) 19. Micro-pneumatic piston 17 includes a support 21 having a passageway 25 through which an air hose 23 extends. Hose 23, coupled to a fitting 28 on a housing 30, communicates with the interior of a hollow cylinder 27, in which a piston 29 is slidably mounted. The cylinder 27 is contained in the housing 30 that is rigidly fixed to the outer wall of support 21. A piston shaft 31 is connected to the piston 29 and slidably extends from a second end of the housing 30. The shaft 31 is rigidly joined to a cross plate 33 that extends in a plane perpendicular to the longitudinal axis of shaft 31.

The LVDT 19 includes a cylindrical form 39 having a central bore 41. Form 39 is rigidly mounted on the surface of support 13 adjacent the support 21. A shaft 43 extends from bore 41 in a direction toward plate 33 and parallel to shaft 31. Shaft 43 is joined at one end to plate 33 and at the other end to a magnetic core 45 that is suspended in bore 41.

Figure 2:
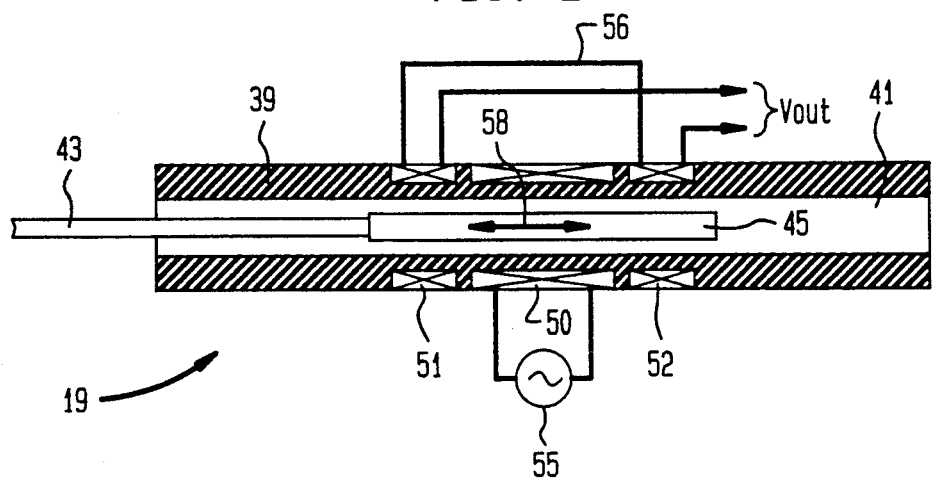
FIG. 2 is a cross-section taken on the line 2—2 in FIG. 1 looking in the direction of the arrows

With reference to FIG. 2, the form 39, made of a suitable non-magnetic material, supports three electrical coils that form a transformer having a primary coil 50 and two substantially identical secondary coils 51 and 52 symmetrically spaced on either side of the primary coil 50. An AC voltage source 55 is connected across the primary coil 50. The secondary coils 51 and 52 are connected by conductor 56 to form a series-opposing circuit with respect to the output Vout. Motion of the non-contacting magnetic core 45 in the directions indicated by the double-headed arrow 58 will vary the mutual inductance between each secondary coil 51, 52 and the primary coil 50. As such, the voltage induced by the primary coil 50 in the secondary coils 51 and 52 may be varied by moving core 45 in the bore 41.

When the core 45 is centered between the secondary coils 51 and 52, the voltages induced in the secondary coils 51 and 52 are identical and 180° out-of-phase, so there is no net output voltage Vout. When the core 45 is moved off-center, the mutual inductance between the primary coil 50 and one of the secondary coils 51, 52 will be greater for one than the other, and a differential Voltage Vout will appear across the secondary coils 51 and 52. For off-center displacements within the range of operation, the voltage Vout is essentially a linear function of the displacement of core 45 in bore 41.

As indicated earlier, at one end of the master 11, the support 21 and the insulating form 39 are each rigidly fixed to the thumb support 13. At the other end, the plate 33 is coupled to finger support 15 via a sphere joint 60 to permit rotary motion of support 15 in all directions over the solid angle 2A. The ball in sphere joint 60 carries a rigid post 59 that is mounted to plate 33 so as to be in alignment with the shaft 31. As will be seen later in greater detail, when forces are applied by the fingers of an operator's hand to the supports 13 and 15, shafts 31 and 43 are simultaneously displaced with respect to housing 30 and form 39, respectively. In response to such displacements, a voltage Vout, as described earlier, will be generated on a pair of conductors contained in a light-weight flexible cable 22. Additionally, cable 22 will contain conductors which connect the AC voltage source 55 to primary coil 50. A supporting frame 34 is fixed to the exterior surfaces of form 39 and housing 30 to help maintain these elements in a spaced parallel relationship.

Figure 4:
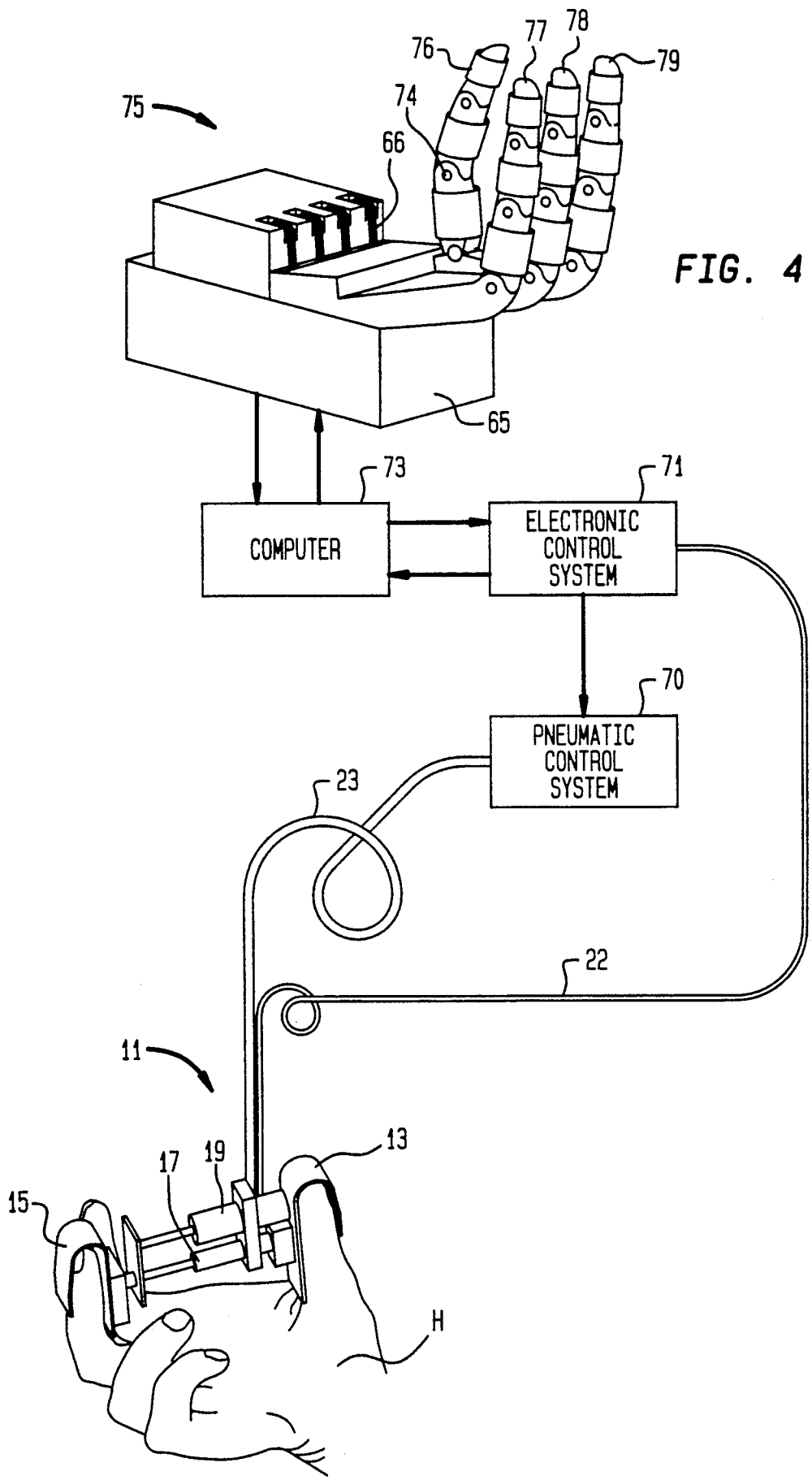
FIG. 4 is, in part, a pictorial view of the preferred master and slave and, in part, a schematic block diagram showing the control system

With reference to FIG. 4, the master 11 is shown mounted on an operator's hand H with the operator's thumb placed in thumb support 13 and the operator's middle finger placed in finger support 15. The supports 13 and 15 are preferably formed from a light-weight, resilient material so as to be capable of lightly grasping the ends of the operator's thumb and finger. As such, the master 11 can comfortably fit between the thumb and middle finger in the space just above the operator's palm. Use of the thumb and middle finger assures a good grip and sufficient distance in which to accommodate the full extension of the piston 17. The sphere joint 60 permits an individual user's thumb and middle finger to assume a relaxed, natural position for operation of the master 11. With the master 11 held between the thumb and middle finger, squeezing the supports 13, 15 toward each other simulates the natural finger movements employed by most humans when grasping an object. It is contemplated that with the angle A equal to about 35°, the master 11 could provide natural operation for most users.

Figure 3:
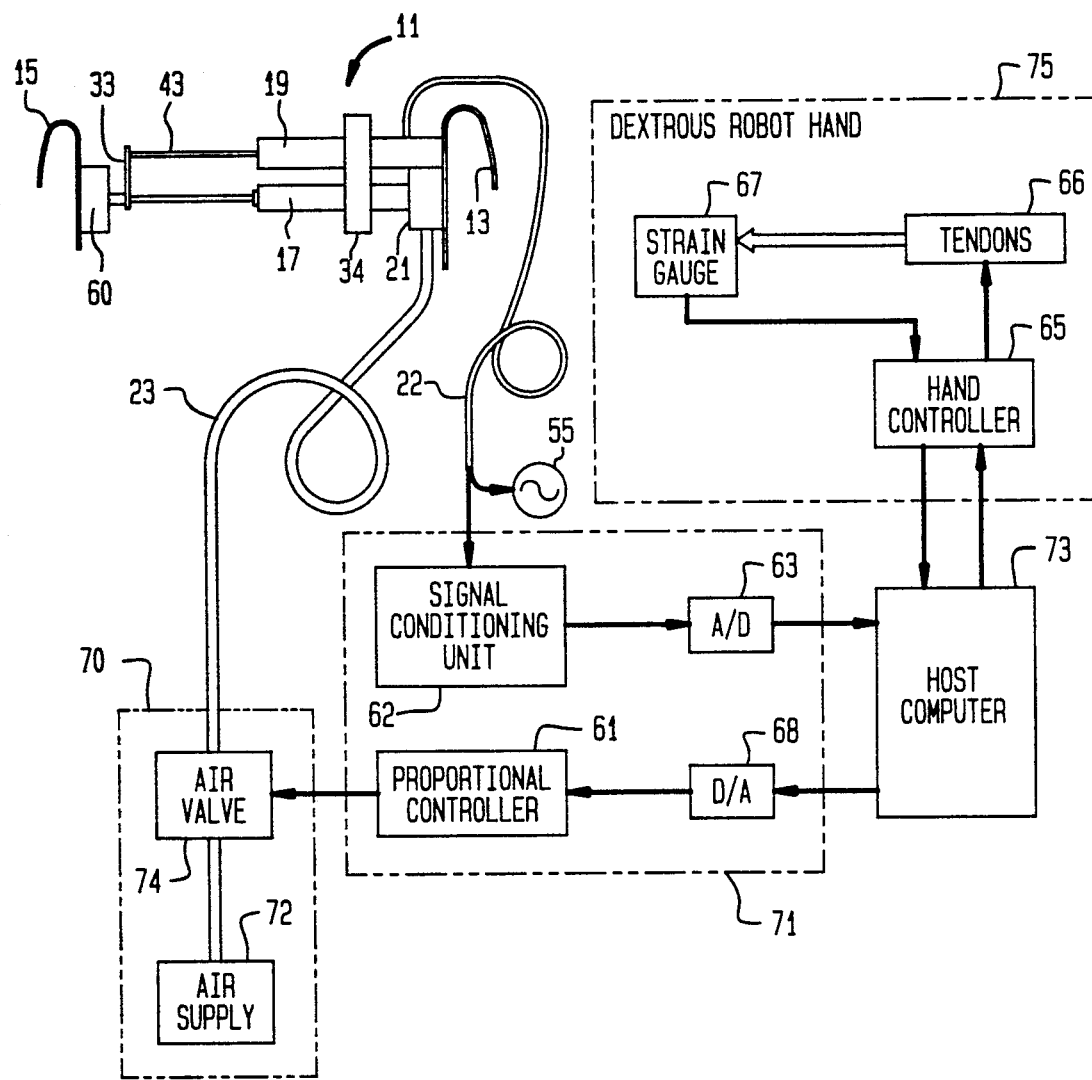
FIG. 3 is a block diagram of a robotic system incorporating the master of FIG. 1.

The air hose 23 extends between the support 21 and a pneumatic control system 70 (FIG. 3). The conductors in cable 22 are connected to a signal conditioning unit 62 in the control system 71 as well as to the AC power supply 55. It is contemplated that the hose 23 and cable 22 be made of light-weight, flexible material so as to permit the operator's hand H to move freely and comfortably.

The pneumatic control system 70 (FIG. 3) includes an air supply 72 connected to an air control valve 74. Operation of the valve 74 is controlled by the output of a proportional controller 61 to automatically regulate the pressure of the air being supplied to piston 17 via hose 23. The input to the signal conditioning unit 62 is connected to the conductors in cable 22 carrying output voltage Vout from LVDT 19. Unit 62 is provided to perform routine conditioning of the voltage Vout by, for example, providing appropriate rectification, amplification, scaling and the like in preparation for transmission of the Vout signal to a computer 73. The output of unit 62 is first digitized by analog-to-digital converter (A/D) 63 before inputting to the host computer 73. The output of A/D 63 will at any particular time be a signal that is measure of the distance between finger supports 13 and 15 of master 11. The host computer 73, using the output signal from A/D 63, will generate an appropriate slave manipulating signal that is used by hand controller 65 of a robot 75 to manipulate the robot end effectors a predetermined amount in accordance with the value of the signal from A/D 63. For example, the end effectors on the dextrous hand 75 (FIG. 4) include one robot thumb 76 and three robot fingers 77, 78, 79. The dextrous hand 75 may be implemented with a conventional dextrous hand such as the Utah-MIT hand described in Jacobson et al. "The Utah-MIT Dextrous Hand: Work in Progress", Journal of Robotics Research 3(4) pp. 21–50 (1984). Of course, the master 11 will work equally well with a robot having conventional grippers instead of the dextrous hand 75.

As indicated in FIGS. 3 and 4, the thumb and fingers 76–79 of the hand 75 are controlled by a plurality of tendons 66 that are manipulated in a conventional manner by a hand controller 65 in response to predetermined signals received from computer 73. More specifically, like the structure of a human hand, each finger joint of thumb 76 and fingers 77, 78, 79 has a different pair of tendons 66 that are used to provide opposing forces about the joint to rotate the associated finger elements about the joint. Conventionally, the various tendons 66 will each be coupled to a strain gauge as illustrated by numeral 67 in FIG. 3. The output of a gauge 67 will indicate the amount of force in the particular tendon 66 to which it is coupled.

In a typical telemanipulation, the user would, for example, squeeze the supports 13 and 15 on master 11 toward each other some given distance. In response, a signal Vout would be generated by LVDT 19. The signal Vout would be processed by signal conditioning unit 62, i.e., rectified, scaled, amplified, etc., in preparation for digitizing in A/D 63. The computer 73, after receiving an input from A/D 63, would calculate or otherwise determine the appropriate signals to be transmitted to the hand controller 65 that would be necessary to move the robot tendons 66 so that the end effectors 76–79 of the robot hand 75 would perform the desired motion. The amount of force that the end effectors 76–79 will exert on an object is monitored by the hand controller 65 via the outputs of strain gauge 67.

The desired telemanipulation may take many forms. For example, it may consist of a squeezing or pinching motion by displacing the end of thumb 76 a fixed distance toward (or away) from some point located halfway between the ends of fingers 78 and 79. In this case, the intended motion of the robot hand 75 will be similar to the motion of the operator's hand H when manipulating master 11. It is to be understood, however, that the master 11 may be used to control other motions of the robot hand 75. For instance, relative displacements between the supports 13 and 15 of the master 11 by the operator's hand H could also control lateral movements of the robot thumb 76 with respect to the fingers 78, 79 to perform a twisting-type motion as commonly used to turn a bolt or like device. The types of motions that the robot hand 75 is capable of performing will typically be programmed into computer 75 and be selected from a menu or the like by the user in a conventional manner known to those skilled in these arts.

It is contemplated in the present invention that force feedback from the robot thumb 76 is to be sent back to the master 11 to control the pneumatic micro-actuator 17. To provide this force feedback, signals generated by the strain gauge 67 (FIG. 4) that is coupled to the tendon 66 which controls rotation of the thumb 76 about the second joint 74 are transmitted to the computer 73 via hand controller 65. The output signals of strain gauge 67 are monitored by computer 73. In response, the computer 73 will generate an appropriate digital output signal to D/A 68 for use by the proportional controller 61 to control the air valve 74 to regulate the air pressure in pneumatic micro-actuator 17 in proportion to the forces on the appropriate tendon 66 of thumb 76. As such, the pressure in micro-actuator 17 will present to the thumb of the operator's hand H a predetermined resistance that will be directly related to the forces developed in the corresponding tendon of the robot thumb 76. This resistance may be felt in the tendons of the user's thumb with substantially the same magnitude as generated in the tendons 66 of the slave. This natural force feedback and resistance will be felt by the thumb of the operator's hand H regardless of the type of manipulation the robot hand 76 is performing, be it a simple squeezing motion or a complex twisting motion. This is true because the force feedback is derived from the tendons 66 of the robot hand 75 and is felt by the corresponding tendon in the operator's thumb. Consequently, the user's thumb may sense the amount of compliance of an object being squeezed or otherwise manipulated by the slave. Of course, as will be evident to those skilled in these arts, the master 11 can be made to create forces in the tendons 66 or other hand controller mechanisms that are many times greater than the forces in the user's hand H.

Obviously many modifications and variations of the present invention are possible in light of the above teachings. For example, as mentioned earlier, the robot system may include conventional robot grippers in lieu of the hand 75. It is, therefore, to be understood, that within the scope of the appended claims, the invention may be practiced otherwise than as specifically described.

What is claimed is:

1. A robot master comprising:
   a first support having means for connecting the first support to the thumb of a user's hand;
   a second support spaced from said first support and having means for connecting the second support to a finger of the user's hand; and
   displacement means connected to and extending between said supports, wherein said displacement means includes a sensing means, responsive to linear displacements of said supports with respect to each other, for providing an electrical output signal that is a function of the linear distance between said supports, and a slide means extending between said supports for permitting linear displacements of said supports with respect to each other, whereby said displacement means can extend adjacent the palm and between the fingers of the user's hand.

2. The robot master of claim 1 wherein the sensing means includes first and second spaced sensing elements having means for sensing the displacement between said spaced sensing elements.

3. The robot master of claim 2 wherein said sensing means is a linear variable differential transformer.

4. The robot master of claim 2 wherein said first sensing element includes an electrical transformer rigidly joined to one of said supports and a magnetic core magnetically coupled to said transformer and joined to the other of said supports.

5. The robot master of claim 2 wherein said supports are rotatably mounted with respect to each other.

6. The robot master of claim 2 wherein said slide means includes a force feedback means mounted between said supports for providing a variable resistance against the displacement of said supports toward each other.

7. The robot master of claim 6 wherein said force feedback means includes a pneumatic cylinder joined to one of the supports, a piston slidably mounted in the cylinder, and a piston rod joined to the piston and to the other of the supports.

8. A robot master comprising:
   a first support having means for coupling the first support to the thumb of the user's hand;
   a second support spaced from said first support and having means for coupling the second support to a finger of the user's hand for movement of the supports towards and away from each other along a longitudinal line;

displacement sensing means connected to said supports for providing an output signal that is a function of the distance between said supports, wherein the sensing means includes first and second spaced sensing elements having means for sensing the displacement between said spaced sensing elements and wherein said first sensing element includes an electrical transformer and a magnetic core magnetically coupled to said transformer, said transformer and said core being joined to a different one of said supports; and a force feedback means mounted between said supports for providing a variable resistance against the displacement of said supports toward each other, wherein said force feedback means includes a pneumatic cylinder joined to one of the supports, a piston slidably mounted in the cylinder, and a piston rod joined to the piston and to the other of the supports.

9. The robot master of claim 8 wherein said transformer is an elongated cylinder having a central longitudinal bore in which said core is suspended.

10. The robot master of claim 9 wherein said transformer and said core have a first, common longitudinal axis, wherein said cylinder and piston have a second, common longitudinal axis, and wherein the first and second axes are parallel to each other and to said longitudinal line.

11. A robot system comprising:

a first support having means for connecting the first support to the thumb of the user's hand;

a second support spaced from said first support and having means for connecting the second support to a finger of the user's hand;

displacement means connected to and extending between said supports, wherein said displacement means includes a sensing means, responsive to linear displacements of said supports with respect to each other, for providing an electrical output signal that is a function of the linear distance between said supports and a slide means for permitting linear displacements of said supports with respect to each other whereby said displacement means can extend adjacent the palm and between the fingers of the user's hand;

a robot hand having end effectors; and control means connected to the output signal of said sensing means by a flexible line for transmitting said output signal to said control means, and said control means connected to said robot hand for moving the end effectors a predetermined distance with respect to each other in response to the value of the output signal.

12. The robot system of claim 11 wherein the sensing means includes first and second spaced sensing elements having means for sensing the displacement between said spaced sensing elements.

13. The robot system of claim 12 wherein said slide means includes a force feedback means mounted between said supports for providing a variable resistance against the displacement of said supports toward each other.

14. The robot system of claim 13 further including a force sensing means mounted on the robot hand for sensing a manipulation force of one of the end effectors and for providing a feedback signal to said control means proportional to said manipulation force, and wherein said control means includes means for varying the resistance of said force feedback means in response to changes in the feedback signal.

15. The robot system of claim 14 wherein the robot hand includes a plurality of tendons connected to said end effectors and wherein said force sensing means includes a strain gauge mounted on one of said tendons for sensing the force therein.

16. A robot system comprising:

a first support having means for coupling the first support to the thumb of the user's hand;

a second support spaced from said first support and having means for coupling the second support to a finger of the user's hand of movement of the supports toward and away from each other along a longitudinal line;

a force feedback means mounted between said supports for providing a variable resistance against the displacement of said supports toward each other, said force feedback means including a pneumatic cylinder joined to one of the supports and a piston slidably mounted in the cylinder and having a piston rod joined to the other of the supports;

displacement sensing means connected to said supports for providing an output signal that is a function of the distance between said supports;

a robot hand having end effectors;

control means connected to output signal of said sensing means and said robot hand for moving the end effectors a predetermined distance with respect to each other in response to the value of the output signal; and a force sensing means mounted on the robot hand for sensing a manipulation force of one of the end effectors and for providing a feedback signal to said control means proportion to said manipulation force, wherein said control means includes means for varying the resistance of said force feedback means in response to changes in the feedback signal, said robot hand includes a plurality of tendons connected to said end effectors, said force sensing means includes a strain gauge mounted on one of said tendons for sensing the force therein, said sensing means includes first and second spaced sensing elements having means for sensing the displacement between said spaced sensing elements.

17. The robot system of claim 16 wherein said control means includes means for varying the air pressure in said piston as a function of said feedback signal.

18. The robot system of claim 17 wherein said first sensing element includes an electrical transformer and a magnetic core magnetically coupled to said transformer, said transformer and said core being joined to a different one of said supports.

19. The robot system of claim 18 wherein said transformer is an elongated cylinder having a central longitudinal bore in which said core is suspended.

20. The robot system of claim 19 wherein said transformer and said core have a first, common longitudinal axis, wherein said cylinder and pistol have a second, common longitudinal axis, and wherein the first and second axes are parallel to each other and to said longitudinal line.

* * * * *